United States Patent
Fujikata et al.

(10) Patent No.: US 8,483,520 B2
(45) Date of Patent: Jul. 9, 2013

(54) OPTICAL MODULATION STRUCTURE AND OPTICAL MODULATOR

(75) Inventors: Junichi Fujikata, Tokyo (JP); Jun Ushida, Tokyo (JP); Akio Toda, Tokyo (JP); Motofumi Saitoh, Tokyo (JP)

(73) Assignee: NEC Corporation, Tokyo (JP)

( * ) Notice: Subject to any disclaimer, the term of this patent is extended or adjusted under 35 U.S.C. 154(b) by 17 days.

(21) Appl. No.: 13/202,680

(22) PCT Filed: Feb. 18, 2010

(86) PCT No.: PCT/JP2010/052430
§ 371 (c)(1),
(2), (4) Date: Aug. 22, 2011

(87) PCT Pub. No.: WO2010/098248
PCT Pub. Date: Sep. 2, 2010

(65) Prior Publication Data
US 2011/0311178 A1 Dec. 22, 2011

(30) Foreign Application Priority Data
Feb. 25, 2009 (JP) ................................. 2009-042317

(51) Int. Cl.
*G02F 1/025* (2006.01)
(52) U.S. Cl.
USPC .................................... 385/3; 385/2; 385/129
(58) Field of Classification Search
None
See application file for complete search history.

(56) References Cited

U.S. PATENT DOCUMENTS

| 6,628,450 | B2 * | 9/2003 | Samara-Rubio | 359/279 |
| 6,757,091 | B1 | 6/2004 | Nicolaescu et al. | |
| 8,300,990 | B2 * | 10/2012 | Li et al. | 385/2 |
| 2003/0206709 | A1 | 11/2003 | Nicolaescu | |
| 2007/0292073 | A1 * | 12/2007 | Li | 385/14 |
| 2008/0112032 | A1 * | 5/2008 | Vlasov et al. | 359/248 |
| 2011/0058764 | A1 * | 3/2011 | Kim et al. | 385/2 |
| 2011/0176762 | A1 * | 7/2011 | Fujikata et al. | 385/2 |

FOREIGN PATENT DOCUMENTS

| JP | 9-503869 | 4/1997 |
| JP | 2002-540469 | 11/2002 |
| JP | 2006-515082 | 5/2006 |

OTHER PUBLICATIONS

English version of written opinion for PCT/JP2010/052430, mailing date Mar. 23, 2010.*
Passaro, V.M.N. et al., Scaling and Optimization of MOS Optical Modulators in Nanometer SOI Waveguides, IEEE Transactions on Nanotechnology, Jul. 2008, vol. 7, No. 4, 401-408.
Samara-Rubio, D. et al., A gigahertz silicon-on-insulator Mach-Zehnder modulator, OFC 2004, 2004.02, vol. 2 PDP15, 1-3.
International Search Report, PCT/JP2010/052430, Mar. 23, 2010.
Green et al., "Ultra-compact, low RF power, 10 Gb/s silicon Mach-Zehnder modulator", Dec. 10, 2007, vol. 15, No. 25, Optics Express 17106.

* cited by examiner

*Primary Examiner* — Mike Stahl
(74) *Attorney, Agent, or Firm* — Young & Thompson

(57) ABSTRACT

An optical modulation structure includes a lower cladding layer (102), a first silicon layer (103) integrally formed from silicon of a first conductivity type on the lower cladding layer (102) while including a core (104) and slab regions (105) arranged on both sides of the core (104) and connected to the core, a concave portion (104*a*) formed in an upper surface of the core (104), and a second silicon layer (109) of a second conductivity type formed on a dielectric layer (108) in the concave portion (104*a*) so as to fill the concave portion (104*a*).

10 Claims, 9 Drawing Sheets

OPTICAL MODULATION STRUCTURE AND OPTICAL MODULATOR

TECHNICAL FIELD

The present invention relates to an optical modulation structure and an optical modulator which are required in the information processing and communication fields to quickly convert a high-speed electrical signal into an optical signal using silicon.

BACKGROUND ART

There are used silicon-based optical communication devices having an optical fiber communication wavelength of 1330 or 1500 nm for various systems such as home optical fibers and local area networks (LANs). The silicon-based optical communication device is a very promising technique that allows to integrate optical functional elements and electronic circuits on a silicon platform using the CMOS technology.

In recent years, silicon-based passive devices such as a waveguide, an optical coupler, and a wavelength filter have been studied very widely. In addition, silicon-based active elements such as an optical modulator and an optical switch have received a great deal of attention as an important technique of operating optical signals for such communication systems. However, an optical switch or a modulation element that changes the refractive index using the thermooptic effect of silicon operates at a low speed and is applicable to only a device speed up to a modulation frequency of 1 Mb/sec. Hence, to implement a high modulation frequency required in more optical communication systems, an optical modulation element using the electrooptic effect is important.

Many of currently proposed electrooptic modulators change the free carrier density in the silicon layer using the carrier plasma effect and thus change the real part and the imaginary part of the refractive index, thereby changing the phase or intensity of light (literature 1: Japanese Patent Laid-Open No. 2006-515082, literature 2: Japanese Patent Laid-Open No. 2002-540469, and literature 3: Japanese Patent Laid-Open No. 9-503869). Pure silicon exhibits no linear electrooptic effect (Pockels) and a very small change in the refractive index by the "Franz-Keldysh" effect or the "Kerr" effect. For this reason, silicon-based modulators widely use the above-described carrier plasma effect. A modulator using free carrier absorption directly modulates the output by changing absorption of light propagating through silicon. The structure using the refractive index change generally uses a Mach-Zehnder interferometer. The Mach-Zehnder interferometer obtains an intensity-modulated signal of light by optical phase interference between two arms.

The free carrier density of the electrooptic modulator can be changed by injecting, storing, removing, or inverting free carriers. However, many of the devices examined so far are poor in the optical modulation efficiency and require a length of mm order for optical phase modulation and an injection current density higher than 1 kA/cm$^3$. To implement a smaller size, higher degree of integration, and lower power consumption, a device structure capable of obtaining a high optical modulation efficiency is necessary. If a high optical modulation efficiency is obtained, the optical phase modulation length can be shorter. A large device is readily affected by the temperature distribution on the silicon platform. For this reason, the refractive index change in the silicon layer caused by the thermooptic effect may problematically cancel the original electrooptic effect.

FIG. 12 shows a typical example of a silicon-based electrooptic phase modulator using a rib-shaped waveguide manufactured using an SOI (Silicon on Insulator) substrate. This electrooptic phase modulator uses, as the lower cladding, a buried insulating layer 1202 formed on a support substrate 1201 that forms the SOI substrate. A rib-shaped core 1205 and slab regions 1204 are formed in an SOI layer 1203 of the SOI substrate. Hence, the core 1205 and the slab regions 1204 are intrinsic semiconductor regions. The electrooptic phase modulator also includes a p$^+$-type region 1206 and an n$^+$-type region 1207, which are formed by doping the slab regions 1204 laterally extending on both sides of the core 1205 with a p-type impurity and an n-type impurity, respectively.

The structure shown in FIG. 12 forms a p-i-n diode modulator. When applied with forward and reverse biases, the structure changes the free carrier density in the intrinsic semiconductor regions such as the core 1205 and thus changes the refractive index using the carrier plasma effect.

In this example, one slab region 1204 made of intrinsic semiconductor silicon is formed so as to include the p$^+$-type region 1206 formed by heavily doping a region in contact with a first electrode contact layer 1208 with a p-type impurity. The other slab region 1204 includes the n$^+$-type region 1207 formed by heavily doping a region in contact with a second electrode contact layer 1209 with an n-type impurity.

In this p-i-n diode structure, the p$^+$-type region 1206 and the n$^+$-type region 1207 may be formed by doping so as to exhibit a carrier density of about $10^{20}$ for every cm$^3$. In the above-described p-i-n structure, the p$^+$-type region 1206 and the n$^+$-type region 1207 are arranged at intervals (slab regions 1204) on both sides of the core 1205 of the intrinsic semiconductor. The core 1205 is covered with an upper cladding 1210 made of silicon oxide, thereby forming an optical waveguide.

The optical modulation operation of the electrooptic phase modulator will be described. A forward bias is applied to the p-i-n diode using the first electrode contact layer 1208 and the second electrode contact layer 1209. The modulator is connected to a power supply so as to inject free carriers into the optical waveguide formed from the core 1205 upon bias application. The bias application increases the number of free carriers and thus changes the refractive index of the core 1205, thereby phase-modulating the light transmitted through the waveguide.

Literature 1 describes a silicon-based electrooptic modulator having an SIS (Silicon-Insulator-Silicon) structure. As shown in FIG. 13, this electrooptic modulator includes a support substrate 1301 that forms an SOI substrate, a p-type main body region formed on a buried insulating layer 1302, and an n-type gate region stacked so as to partially overlap the p-type main body region. The p-type main body region includes a p-type silicon layer 1303 doped with a p-type impurity, a p$^+$-type silicon layer 1304 heavily doped with a p-type impurity, and an electrode contact layer 1305.

The n-type gate region includes an n-type silicon layer 1307 doped with an n-type impurity, an n$^+$-type silicon layer 1308 heavily doped with an n-type impurity, and an electrode contact layer 1309. The electrode contact layers 1305 and 1309 are, for example, a metal silicide. A dielectric layer 1306 is formed in the region where the p-type silicon layer 1303 (main body region) and the n-type silicon layer 1307 (gate region) overlap. A cladding layer 1311 made of silicon oxide is formed to cover the main body region and the gate region.

The impurity concentrations in the p-type silicon layer 1303 and the n-type silicon layer 1307 are set such that the carrier density change is controlled by an external signal voltage. In the p-type silicon layer 1303 and the n-type silicon layer 1307 on both sides of the dielectric layer 1306, optical phase modulation is performed by removing, or inverting the free carriers. Ideally, the optical signal field and the carrier density are preferably externally dynamically controlled in the same region.

DISCLOSURE OF INVENTION

Problems to be Solved by the Invention

However, the above-described silicon-based optical modulator using the carrier plasma effect cannot easily attain a high-speed operation by reducing the device size, as will be described below.

The optical modulation operation speed of the electrooptic phase modulator explained with reference to FIG. 12 is limited by the life of free carriers in the core 1205 and carrier diffusion when the forward bias has been removed. The electrooptic phase modulator having such a p-i-n diode structure normally has an operation speed of 10 to 50 Mb/sec in the forward bias operation. The switching speed can be increased by introducing an impurity into the silicon layer (core 1205) to shorten the carrier life. However, impurity introduction into the core 1205 leads to a decrease in the optical modulation efficiency.

The factor that most affects the operation speed is the RC time constant. In the above-described electrooptic phase modulator, the capacitance (C) upon forward bias application greatly increases because of the decrease of the carrier depletion layer at the p-n junction. Theoretically, the high-speed operation of the p-n junction can be achieved by applying a reverse bias. However, this needs a relatively high driving voltage or a large device size.

In the electrooptic modulator described in literature 1, the region where the carrier density dynamically changes is as thin as several ten nm in fact. For this reason, an optical modulation length of mm order is necessary. As a result, the electrooptic modulator of patent literature 1 becomes bulky, and the high-speed operation is difficult. Additionally, since the gate region is provided on the SOI substrate, optical coupling with the silicon waveguides formed on both sides of that region is difficult. In this electrooptic modulator, a spot size converter structure or the like needs to be formed for matching of the optical field size, resulting in a larger optical loss and higher manufacturing cost.

The present invention has been made to solve the above-described problems, and has as its exemplary object to allow a silicon-based optical modulation structure using the carrier plasma effect to implement modulation at a higher speed on the order of submicron.

Means of Solution to the Problems

An optical modulation structure of an exemplary aspect of the invention includes at least a lower cladding layer formed on a substrate, a first silicon layer integrally formed from silicon of a first conductivity type on the lower cladding layer, including a core and slab regions arranged on both sides of the core and connected to the core, a concave portion formed in an upper surface of the core, a second silicon layer of a second conductivity type formed on a dielectric layer in the concave portion so as to fill the concave portion, an upper cladding layer formed on the core, a first electrode extraction portion formed on the core and connected to the second silicon layer, and a second electrode extraction portion connected to each slab region.

An optical modulator according to another exemplary aspect of the invention includes a Mach-Zehnder interferometer type structure including a first arm and a second arm, each of the first arm and the second arm comprising the above-described optical modulation structure.

Effects of the Invention

As described above, according to the present invention, the concave portion formed in the upper surface of the core formed, integrally with the slab regions, from the first silicon layer made of silicon of the first conductivity type, and the second silicon layer of the second conductivity type formed on the dielectric layer in the concave portion so as to fill the concave portion are provided. This allows a silicon-based optical modulation structure using the carrier plasma effect to implement modulation at a higher speed on the order of submicron.

BEST MODE FOR CARRYING OUT THE INVENTION

The exemplary embodiments will now be described with reference to the accompanying drawings.

First Exemplary Embodiment

Figure 1:
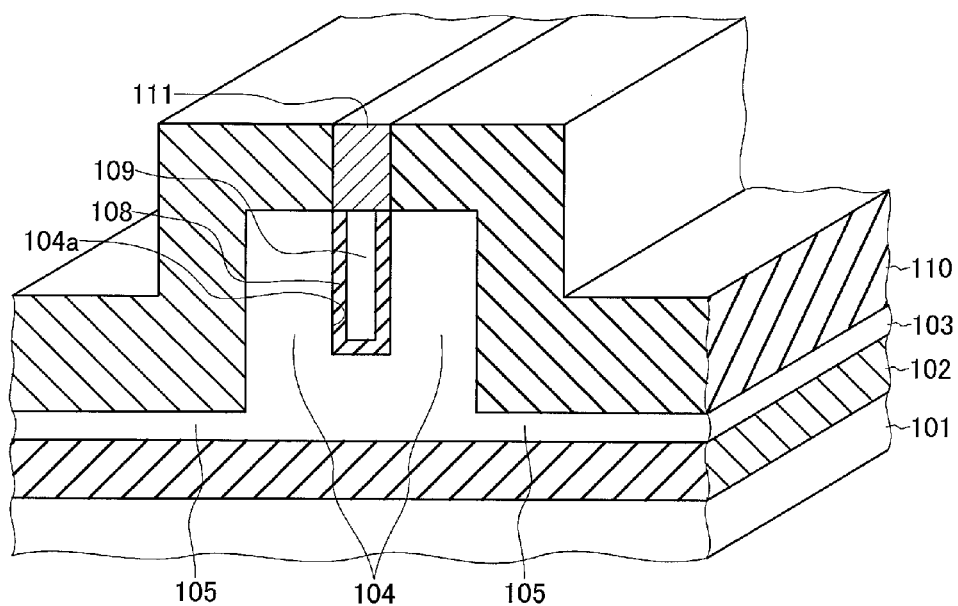
FIG. 1 is a perspective view showing the arrangement of an optical modulation structure according to the first exemplary embodiment of the present invention.
Figure 2:
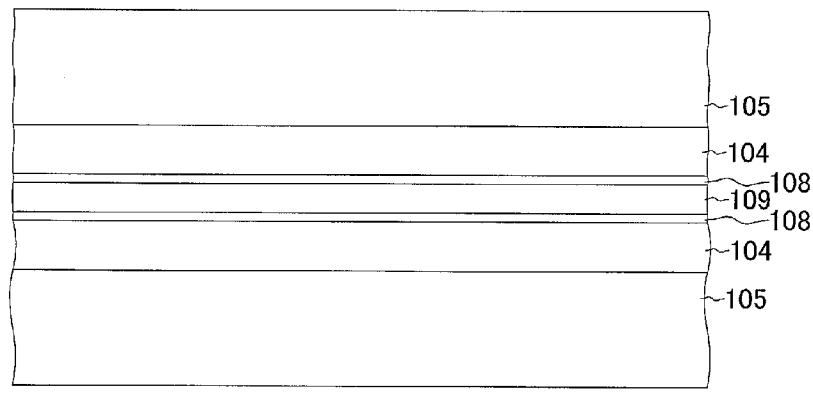
FIG. 2 is a plan view showing the arrangement of the optical modulation structure according to the first exemplary embodiment of the present invention.

The first exemplary embodiment will be described first with reference to FIGS. 1 and 2. FIG. 1 is a perspective view showing the arrangement of an optical modulator according to the first exemplary embodiment. FIG. 1 illustrates a section, too. FIG. 2 is a plan view.

The optical modulation structure of this exemplary embodiment includes a lower cladding layer 102, a first silicon layer 103 integrally formed from silicon of a first conductivity type on the lower cladding layer 102 while including a core 104 and slab regions 105 arranged on both sides of the core 104 and connected to the core, a concave portion 104a formed in the upper surface of the core 104, and a second silicon layer 109 of a second conductivity type formed on a dielectric layer 108 in the concave portion 104a so as to fill the concave portion 104a. The core 104 includes the dielectric layer 108 and the second silicon layer 109 which are formed in the concave portion 104a. Note that in this exemplary embodiment, the concave portion 104a is arranged almost at the center of the section of the core 104 in the widthwise direction. However, the exemplary embodiment is not limited to this, and the core may be arranged on the left or right side.

In this exemplary embodiment, as shown in the plan view of FIG. 2, the dielectric layer 108 and the second silicon layer 109 run in the running direction of the core 104. In this exemplary embodiment, the concave portion 104a is a trench that runs in the running direction of the core 104, as can be seen. The optical modulator also includes an upper cladding layer 110 formed on the core 104 and a first electrode extraction portion 111 formed on the core 104 and connected to the second silicon layer 109. For example, the first electrode extraction portion 111 extends through the upper cladding layer 110. A second electrode extraction portion (not shown) is connected to the slab region 105.

The above-described optical modulation structure is formed using, for example, a well-known SOI substrate. The lower cladding layer 102 is a buried insulating layer formed on a support substrate 101. The first silicon layer 103 is an SOI layer on the buried insulating layer. The first silicon layer 103 is, for example, a p-type layer formed by introducing a p-type impurity. The second silicon layer 109 is, for example, an n-type polysilicon layer formed by introducing an n-type impurity.

The first electrode extraction portion 111 is made of polysilicon in which the n-type impurity is introduced at a concentration higher than that of the second silicon layer 109. The second electrode extraction portion (not shown) can include a p$^+$-type region formed by introducing the p-type impurity into a region of the slab region 105 apart from the core 104 by a predetermined distance at a concentration higher than that of the slab region 105, and an electrode contact layer formed on the p$^+$-type region. The electrode contact layer is made of, for example, a silicide.

As described above, in this exemplary embodiment, the optical modulator has a rib-shaped waveguide structure in which the rib-shaped core 104 is sandwiched between the lower cladding layer 102 and the upper cladding layer 110. In addition, the core 104, the dielectric layer 108, and the second silicon layer 109 form an SIS junction.

To reduce the optical loss in the rib-shaped optical waveguide structure formed from the core 104, the width of the first electrode extraction portion 111 projecting from the upper surface of the core 104 is designed such that the effective refractive index difference with respect to the optical waveguide formed from the core 104 is 5% or less. This conspicuously reduces the optical field on the first electrode extraction portion 111 and thus reduces the optical loss. In addition, the connection loss that occurs upon connecting the optical waveguide can also be reduced.

In the optical modulation structure of the first exemplary embodiment including the SIS junction, when an electrical signal is applied as a driving voltage, regions where the carrier density is modulated because of storage, depletion, or inversion of carriers are formed (generated) in the second silicon layer 109 and the core 104 on both sides of the dielectric layer 108. The width (spread width) of the region where the carrier density is modulated is estimated to be 100 nm or less. Hence, the SIS structure is generally problematic because the carrier density modulation region is very small with respect to the spread of the optical signal field, and the modulation efficiency is low.

However, according to this exemplary embodiment, the SIS junction serving as the region of carrier density modulation is buried from the surface (upper surface) of the core 104, thereby widening the SIS junction region. As a result, according to this exemplary embodiment, the optical signal field and the carrier density modulation region overlap more widely, and a high modulation efficiency can be obtained. Note that the dielectric layer 108 has such a thickness that effects the above-described carrier density modulation when a voltage is applied, through the dielectric layer 108, to the silicon layer on both sides.

Note that letting W be the thickness of the region where the carrier density is modulated, the width of the second silicon layer 109 in the running direction is preferably 2 W or less. If the width of the second silicon layer 109 is larger than 2 W, the region where the carrier density is modulated does not reach the center of the second silicon layer 109, resulting in a decrease in the modulation efficiency.

Let $n_{eff}$ be the effective refractive index felt by the optical signal field, and $\lambda$ be the optical signal wavelength. To suppress reflection of the optical signal, the height is preferably $\lambda/n_{eff}$ or less. This is because the highest optical modulation efficiency can be obtained when the region where the optical signal field has the peak intensity is arranged in the region where the free carriers are stored, removed, or inverted (the region where the carrier density is modulated) on both sides of the dielectric layer 108.

The operation (modulation mechanism) of the above-described optical modulator according to the exemplary embodiment will be described next. The optical modulation structure of this exemplary embodiment uses the electrooptic effect (free-carrier plasma effect) to be described below.

The pure electrooptic effect does not exist or is very weak in silicon. For this reason, a silicon-based device uses the free-carrier plasma effect and the thermooptic effect for the optical modulation operation. The free-carrier plasma effect is effective for the high-speed operation (Gb/sec or more) the exemplary embodiment aims at. The free-carrier plasma effect is explained by the first order approximate values of

[Mathematical 1]

$$\Delta n = -\frac{e^2 \lambda^2}{8\pi^2 c^2 \varepsilon_0 n} \left( \frac{\Delta N_e}{m_e} + \frac{\Delta N_h}{m_h} \right) \quad (1)$$

$$\Delta k = -\frac{e^3 \lambda^2}{8\pi^2 c^3 \varepsilon_0 n} \left( \frac{\Delta N_e}{m_e^2 \mu_e} + \frac{\Delta N_h}{m_h^2 \mu_h} \right) \quad (2)$$

where $\Delta n$ and $\Delta k$ are the real part and the imaginary part of the refractive index change in the silicon layer, e is a charge, $\lambda$ is the optical wavelength, $\varepsilon_0$ is the dielectric constant in vacuum, n is the refractive index of intrinsic semiconductor silicon, $m_e$ is the effective mass of electron carriers, $m_h$ is the effective mass of hole carriers, $\mu_o$ is the mobility of electron carriers, $\mu_h$ is the mobility of hole carriers, $\Delta N_e$ is the density change of electron carriers, and $\Delta N_h$ is the density change of hole carriers.

The electrooptic effect in silicon has been evaluated experimentally, and it has been found that the refractive index change with respect to the carrier density at the wavelength of 1330 nm or 1500 nm used in the optical communication system matches with the "Drude" expression well. In the electrooptic modulator using this effect, the phase change amount is defined by

[Mathematical 2]

$$\Delta \theta = \frac{2\pi}{\lambda} \Delta n_{eff} L \quad (3)$$

where L is the length of the active layer along the light propagation direction of the electrooptic modulator.

In the exemplary embodiment, the phase change amount is a large effect relative to light absorption. The optical modulator to be described below fundamentally exhibits the features of a phase modulator.

Figure 12:
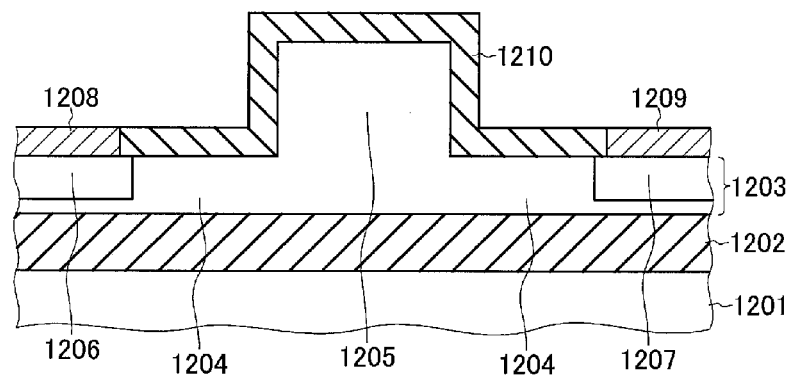
FIG. 12 is a sectional view showing the arrangement of a silicon-based electrooptic phase modulator using a rib-shaped waveguide manufactured using an SOI substrate.
Figure 13:
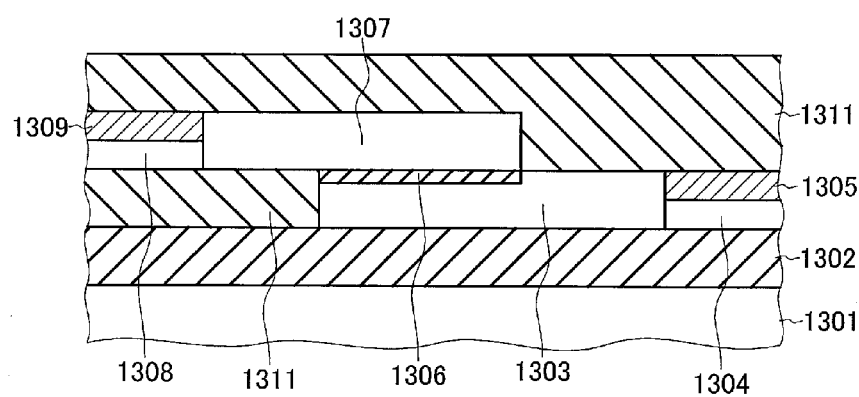
FIG. 13 is a sectional view showing the arrangement of a silicon-based electrooptic modulator having an SIS structure described in patent literature 1.

In the p-i-n structure and the SIS structure described with reference to FIGS. 12 and 13, the overlap between the optical field and the region where the carrier density is modulated is small, and the size of the optical modulation structure increases.

However, in the optical modulation structure according to this exemplary embodiment, a silicon layer of a conductivity type different from that of the core 104 is buried from the upper surface of the core 104 to form the SIS structure. This allows to make the above-described overlap between the optical signal field and the free carrier density modulation region larger. It is consequently possible to reduce the entire device size.

Providing a heavily-doped region connected to each silicon layer of silicon semiconductor (first silicon layer)—dielectric layer—silicon semiconductor (second silicon layer) enables to reduce the series resistance component in the SIS structure and reduce the RC time constant.

A rib/ridge-shaped waveguide structure as shown in FIG. 1 is formed, and a structure with a higher impurity doping concentration is formed in part of the slab region 105. This allows to reduce the light absorption loss caused by the overlap between the electrode extraction portion and the optical field by the core 104. As a result, it is possible to obtain an electrooptic device capable of performing a high-speed operation with a small RC time constant and reducing the optical loss.

If a silicon optical waveguide having a rib/ridge structure with an effective refractive index of 5% or less is formed and connected to each of the front and rear sides of the optical modulation structure of this exemplary embodiment in the optical waveguide direction. This enables very efficient optical connection.

The width of the second silicon layer 109 will be described next. In the thermal equilibrium state, the above-described width W of the region where the carrier density is modulated is given by

[Mathematical 3]

$$W = 2 \sqrt{\frac{\varepsilon_s k T \ln\left(\frac{N_c}{n_i}\right)}{e^2 N_c}} \quad (4)$$

where $\varepsilon_s$ is the dielectric constant of the silicon semiconductor layer, k is the Boltzmann constant, $N_c$ is the carrier density, $n_i$ is the intrinsic carrier density, and e is the charge amount.

For example, when $N_c$ is $10^{17}/cm^3$, the maximum depletion layer thickness is about 0.1 µm. As the carrier density rises, the depletion layer thickness, that is, the width W of the region where the carrier density is modulated decreases.

On the other hand, letting $n_{eff}$ be the effective refractive index felt by the optical signal field in the optical modulation structure, and $\lambda$ be the optical signal wavelength, the height of the second silicon layer 109 buried from the upper surface of the core 104 is preferably $\lambda/n_{eff}$ or less. In this state, the overlap between the optical field by the core 104 and the region where the carrier density is modulated in the region of the dielectric layer 108 is maximum, and efficient optical phase modulation is implemented.

Note that the second silicon layer 109 and the first electrode extraction portion 111 are made of at least one material selected from the group consisting of polysilicon, amorphous silicon, strained silicon, single-crystal silicon, and $Si_xGe_{1-x}$.

Second Exemplary Embodiment

Figure 3:
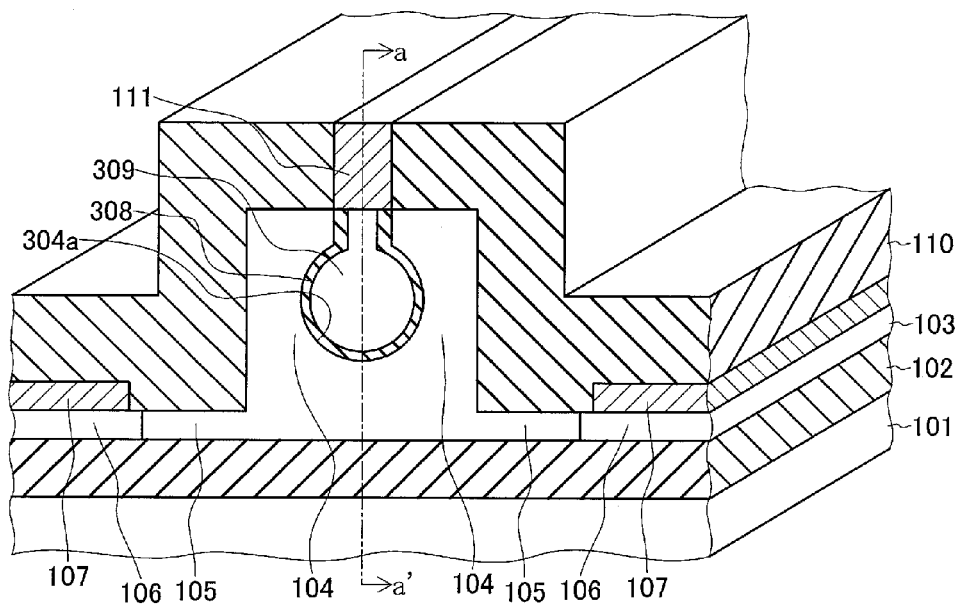
FIG. 3 is a perspective view showing the arrangement of an optical modulation structure according to the second exemplary embodiment of the present invention.

The second exemplary embodiment will be explained next with reference to FIGS. 3 and 4. FIG. 3 is a perspective view of the second exemplary embodiment, and illustrates a section, too. In this exemplary embodiment, a concave portion 304a formed from the upper surface of a core 104 has a central region where the opening is wider than that of the upper portion of the core 104, and the sidewall of the central region is curved. FIG. 3 illustrates a section of the concave portion 304a including a rectangular portion on the upper side and a circular portion on the lower side. Hence, the section of a second silicon layer 309 of a second conductivity type formed on a dielectric layer 308 also includes a rectangular portion on the upper side and a circular portion on the lower side. In this exemplary embodiment as well, the core 104 includes the dielectric layer 308 and the second silicon layer 309 which are formed in the concave portion 304a.

This can make the region where the dielectric layer 308 is formed larger than in the above-described first exemplary embodiment. Since the overlap between the optical signal field in the waveguide portion formed from the core 104 and the region where the carrier density is modulated is further improved, a higher modulation efficiency can be obtained. In addition, using the curved surface suppresses formation of a corner portion to which the electric field readily concentrates. Hence, the carrier density can be modulated at a lower voltage.

Figure 4:
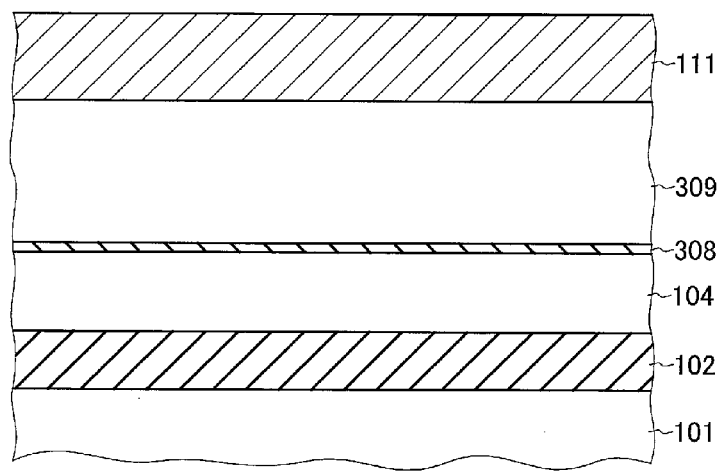
FIG. 4 is a sectional view showing the arrangement of the optical modulation structure according to the second exemplary embodiment of the present invention.

Note that as shown in the sectional view of FIG. 4, the dielectric layer 308 and the second silicon layer 309 run in the running direction of the core 104. FIG. 4 shows the section taken along a line a-a' in FIG. 3. In this exemplary embodiment as well, the concave portion 304a is a trench that runs in the running direction of the core 104, as can be seen.

In this exemplary embodiment, the optical modulator includes p$^+$-type regions 106 each serving as a second electrode extraction portion, and electrode contact layers 107 formed on the p$^+$-type regions. Each p$^+$-type region 106 is arranged in a region of a slab region 105 apart from the core 104 by a predetermined distance. The p$^+$-type region 106 is formed by introducing a p-type impurity at a concentration higher than that of the slab region 105. Note that the remaining components are the same as in the above-described first exemplary embodiment. A second electrode extraction portion having the same structure as in the second exemplary embodiment may be provided in the above-described first exemplary embodiment.

For example, if the thickness of the slab region 105 is 100 nm or less, the p$^+$-type region 106 can be arranged closer to the core 104. Thinning the slab region 105 enables to suppress spread of the optical signal field around the core 104. Even if the p$^+$-type region 106 is located closer to the core 104, the magnitude of the optical signal field in the p$^+$-type region 106 can be reduced. Locating the p$^+$-type region 106 closer to the core 104 allows to reduce the series resistance component across the core 104, the dielectric layer 308, the second silicon layer 309, and a first electrode extraction portion 111. Accordingly, carrier storage or removal in the region of the dielectric layer 308 can be done quickly. This makes it possible to reduce the size of the device of the optical modulation structure and implement speedup and lower power consumption.

Note that in this exemplary embodiment as well, the width of the first electrode extraction portion 111 projecting from the upper surface of the core 104 is designed such that the effective refractive index difference with respect to the optical waveguide formed from the core 104 is 5% or less to reduce the optical loss in the rib-shaped optical waveguide structure formed from the core 104.

Third Exemplary Embodiment

Figure 5:
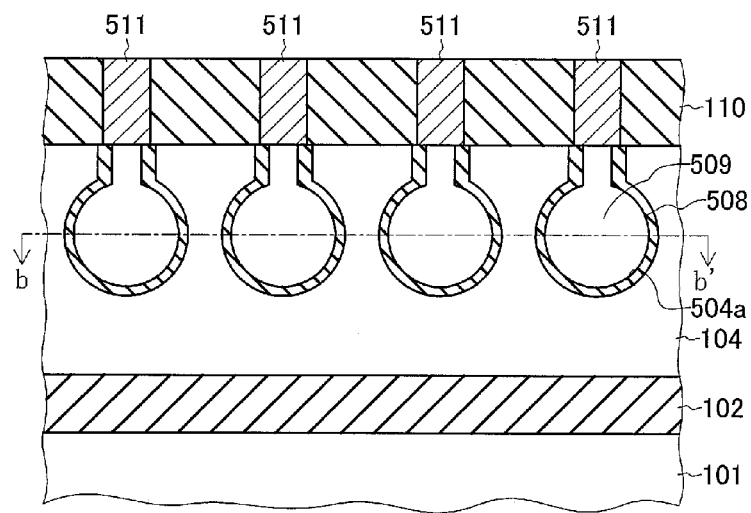
FIG. 5 is a sectional view showing the arrangement of an optical modulation structure according to the third exemplary embodiment of the present invention.
Figure 6:
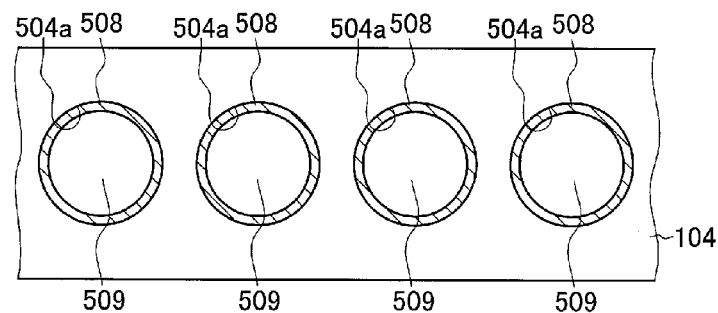
FIG. 6 is a sectional view showing the arrangement of the optical modulation structure according to the third exemplary embodiment of the present invention.

The third exemplary embodiment will be described next with reference to FIGS. 5 and 6. FIGS. 5 and 6 are sectional views showing the arrangement of an optical modulation structure according to the third exemplary embodiment. FIG. 6 shows a section taken along a line b-b' in FIG. 5.

In this exemplary embodiment, a plurality of concave portions 504a are provided in a core 104. In each concave portion 504a, a second silicon layer 509 is formed on a dielectric layer 508 to fill the concave portion. A plurality of first electrode extraction portions 511 are formed on the core 104 and connected to the second silicon layers 509, respectively. The plurality of concave portions 504a are arrayed in the running direction of the core 104 (light propagation direction) while being spaced apart from each other. In this exemplary embodiment, the plurality of concave portions 504a are arrayed at equal intervals.

In this exemplary embodiment, each concave portion 504a has a central region where the opening is wider than that of the upper portion of the core 104, and the sidewall of the central region is curved, as in the above-described second exemplary embodiment. The section of the concave portion 504a includes a rectangular portion on the upper side and a circular portion on the lower side. In addition, the concave portion 504a has a shape obtained by rotating the sectional shape shown in FIG. 5 about the vertical center line. Note that the remaining components are the same as in the above-described second exemplary embodiment.

The plurality of concave portions 504a are periodically formed to reduce the group speed of an optical signal guided through the optical waveguide formed from the core 104. Letting $n_{eff}$ be the effective refractive index nonperiodically felt by the optical signal field, and $\lambda$ be the optical signal wavelength, the plurality of concave portions 504a may be arrayed at an interval equal to or less than $\lambda/n_{eff}$. Thus arraying the concave portions enables to suppress reflection of the optical signal.

Note that in this exemplary embodiment as well, the width of the first electrode extraction portion 511 projecting from the upper surface of the core 104 is designed such that the effective refractive index difference with respect to the optical waveguide formed from the core 104 is 5% or less to reduce the optical loss in the rib-shaped optical waveguide structure formed from the core 104.

In this exemplary embodiment as well, letting W be the thickness of the region spreading from the dielectric layer 508, where the carrier density is modulated, the widthwise size (width) of the second silicon layer is preferably 2 W or less.

Fourth Exemplary Embodiment

Figure 7A:
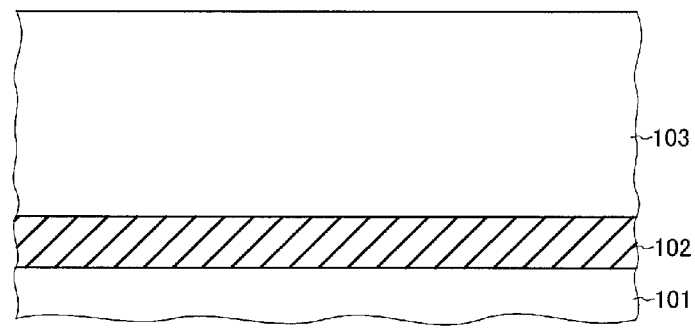
FIG. 7A is a sectional view showing the arrangement in each step so as to explain a method of manufacturing an optical modulation structure according to the fourth exemplary embodiment of the present invention.

The fourth exemplary embodiment will be explained next together with a manufacturing method. First, as shown in FIG. 7A, an SOI substrate including a support substrate 101, a buried insulating layer serving as a lower cladding layer 102, and an SOI layer serving as a first silicon layer 103 is prepared. For example, the lower cladding layer 102 has a thickness of 1000 nm or more, and the first silicon layer 103 has a thickness of about 300 to 1000 nm. Boron ions are implanted into the first silicon layer 103, and annealing is performed to recover damage, thereby forming the first silicon layer 103 of a p type. Note that an SOI substrate in which the first silicon layer 103 of a p type is formed in advance may be used.

Figure 7B:
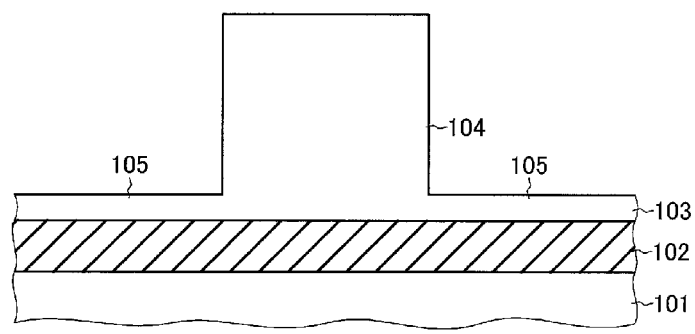
FIG. 7B is a sectional view showing the arrangement in each step so as to explain the method of manufacturing the optical modulation structure according to the fourth exemplary embodiment of the present invention.

As shown in FIG. 7B, the first silicon layer 103 is processed into a rib-shaped waveguide structure to form a core 104 and slab regions 105. For example, a resist pattern is formed by the known lithography technique. The first silicon layer 103 is selectively etched by known reactive etching using the resist pattern as a mask, thereby forming the core 104 and the slab regions 105.

Figure 7C:
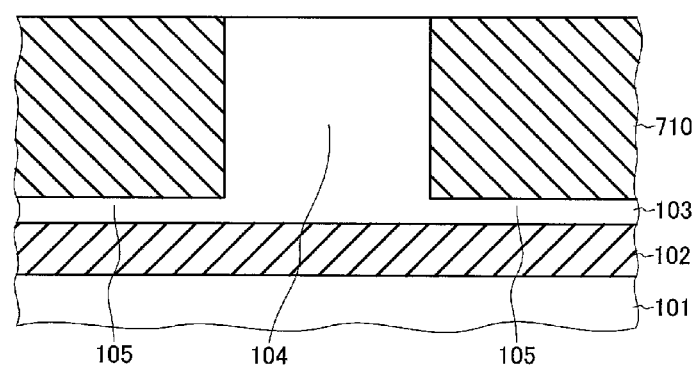
FIG. 7C is a sectional view showing the arrangement in each step so as to explain the method of manufacturing the optical modulation structure according to the fourth exemplary embodiment of the present invention.

A silicon oxide film having a thickness of about 300 to 700 nm is formed on the first silicon layer 103 with the core 104. The formed silicon oxide film is planarized by known CMP (Chemical Mechanical Polishing process). With this process, the upper surface of the core 104 is exposed, and a silicon oxide layer 710 that fills the side parts of the core 104 is formed, as shown in FIG. 7C.

Figure 7D:
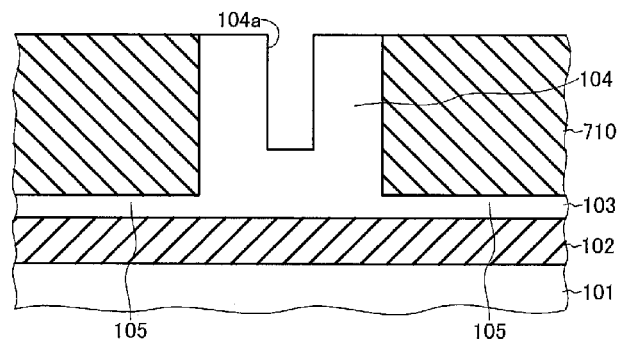
FIG. 7D is a sectional view showing the arrangement in each step so as to explain the method of manufacturing the optical modulation structure according to the fourth exemplary embodiment of the present invention.

As shown in FIG. 7D, a concave portion 104a serving as a trench is formed in the core 104. For example, a resist pattern having an opening corresponding to the concave portion 104a is formed on the core 104 (and the silicon oxide layer 710) by the known lithography technique. The core 104 is selectively etched by known reactive etching using the resist pattern as a mask, thereby forming the concave portion 104a. After that, the resist pattern is removed.

Figure 7E:
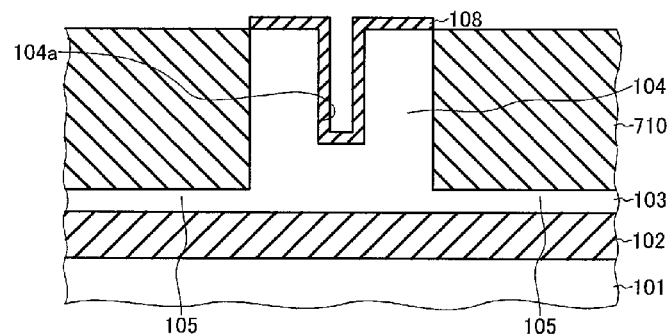
FIG. 7E is a sectional view showing the arrangement in each step so as to explain the method of manufacturing the optical modulation structure according to the fourth exemplary embodiment of the present invention.

As shown in FIG. 7E, a dielectric layer 108 is formed on the exposed portion including the upper surface of the core 104 and the inner surface of the concave portion 104a. For example, the dielectric layer 108 is formed by thermally oxidizing the exposed surface of the core 104 made of silicon. Alternatively, the dielectric layer 108 may be formed using a film of silicon nitride or another high-k insulating material deposited by well-known sputtering or CVD.

Figure 7F:
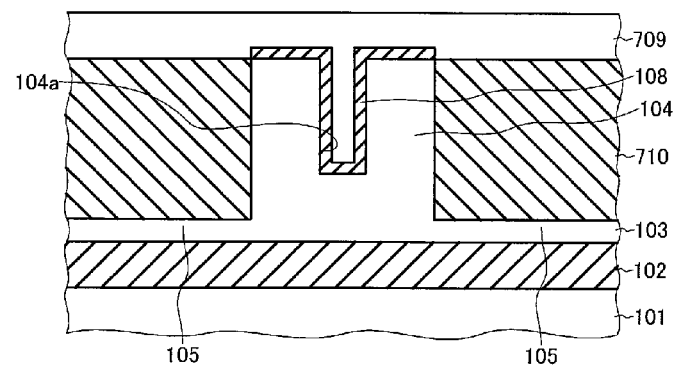
FIG. 7F is a sectional view showing the arrangement in each step so as to explain the method of manufacturing the optical modulation structure according to the fourth exemplary embodiment of the present invention.

As shown in FIG. 7F, a polysilicon film 709 is formed on the dielectric layer 108 and the silicon oxide layer 710 by well-known CVD or sputtering. The polysilicon film 709 is formed to fill the interior of the concave portion 104a covered with the dielectric layer 108. The polysilicon film 709 is formed on the core 104 as well. The upper surface of the deposited polysilicon film 709 is uneven because of the unevenness of the concave portion 104a and the like. The uneven surface of the polysilicon film 709 is polished and planarized by, for example, well-known CMP. Note that the polysilicon film 709 is converted into an n-type film by introducing phosphorus upon a doping process during film formation or ion implantation after film formation.

Figure 7G:
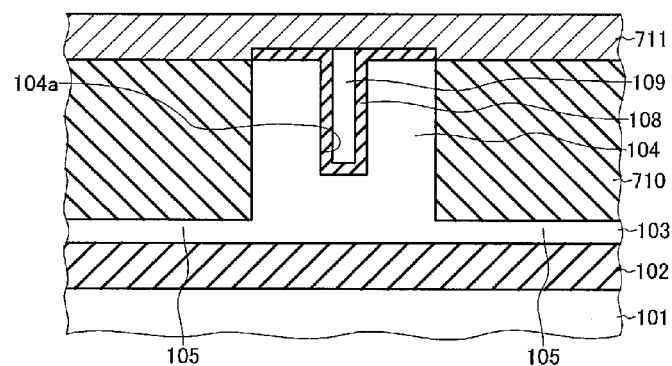
FIG. 7G is a sectional view showing the arrangement in each step so as to explain the method of manufacturing the optical modulation structure according to the fourth exemplary embodiment of the present invention.

Phosphorus is additionally introduced into the surface portion of the polysilicon film 709 by ion implantation or the like, thereby forming an n+-type silicon layer 711 having a higher concentration, as shown in FIG. 7G. No phosphorus is additionally introduced into the concave portion 104a via the dielectric layer 108, thereby forming a second silicon layer 109 arranged on the dielectric layer 108 in the concave portion 104a.

Figure 7H:
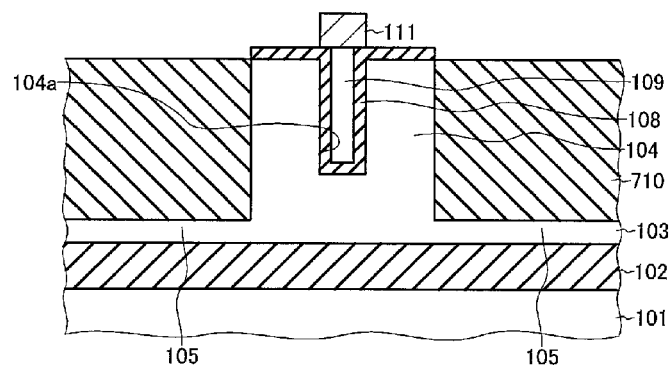
FIG. 7H is a sectional view showing the arrangement in each step so as to explain the method of manufacturing the optical modulation structure according to the fourth exemplary embodiment of the present invention.

As shown in FIG. 7H, a first electrode extraction portion 111 connected to the second silicon layer 109 is formed. For example, the n+-type silicon layer 711 is processed by known photolithography and reactive etching to form the first electrode extraction portion 111 whose width ranges from 0.3 μm to 2 μm.

Figure 7I:
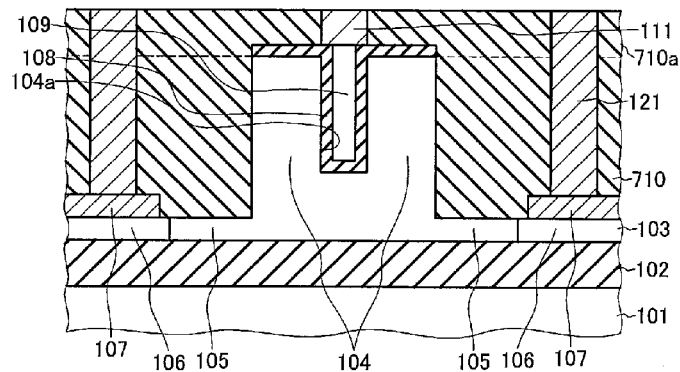
FIG. 7I is a sectional view showing the arrangement in each step so as to explain the method of manufacturing the optical modulation structure according to the fourth exemplary embodiment of the present invention.

As shown in FIG. 7I, p+-type regions 106 are formed in the slab regions 105 apart from the core 104. Electrode contact layers 107 are formed on the p+-type regions 106. A silicon oxide layer 710a is formed on the silicon oxide layer 710 while exposing the upper surface of the first electrode extraction portion 111. Contact plugs 121 connected to the electrode contact layers 107 are formed.

For example, first, the silicon oxide layer 710 is partially removed to expose part of the slab regions 105. Boron is additionally introduced into the exposed slab regions 105 by ion implantation or the like, thereby forming the p+-type regions 106. A metal layer of, for example, titanium or tungsten is formed on each p+-type region 106 and processed to form the electrode contact layer 107 made of a silicide.

After that, the silicon oxide layer 710a is deposited on the silicon oxide layer 710 so as to fill the portions on the electrode contact layers 107 and bury the first electrode extraction portion 111. A silicon oxide film is deposited on the silicon oxide layer 710 and polished and planarized by CMP, thereby forming the silicon oxide layer 710a through which the upper surface of the first electrode extraction portion 111 is exposed. After that, contact holes extending through the silicon oxide layers 710a and 710 up to the electrode contact layers 107 are formed. The contact holes are filled with a metal such as TaN/Al (Cu) to form the contact plugs 121. The contact plugs 121 are connected to a driving circuit (not shown).

Figure 8:
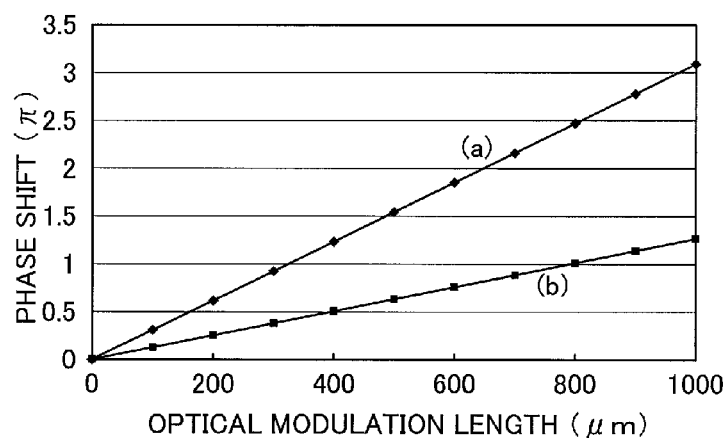
FIG. 8 is a graph showing the dependence of the phase shift amount on the length in the optical signal propagation direction in an "unburied" structure and a "buried" structure.

The optical modulation efficiency in the optical modulation structure according to this exemplary embodiment will be described next. The following description will be done by defining the electrooptic phase modulator explained with reference to FIG. 12 as an "unburied" structure and the optical modulation structure according to this exemplary embodiment as a "buried" structure. FIG. 8 shows the dependence of the phase shift amount on the length in the optical signal propagation direction in each structure. As indicated by (a) of FIG. 8, in the "buried" structure in which the second silicon layer 109 having a width of about 160 nm, like the region where carrier modulation occurs, is buried, the optical modulation efficiency is notably improved. As for the burying depth of the second silicon layer 109, it was confirmed that the optical modulation efficiency can be improved by increasing the depth to about $\lambda/n_{eff}$. Note that (b) of FIG. 8 represents the result of the "unburied" structure.

Figure 9:
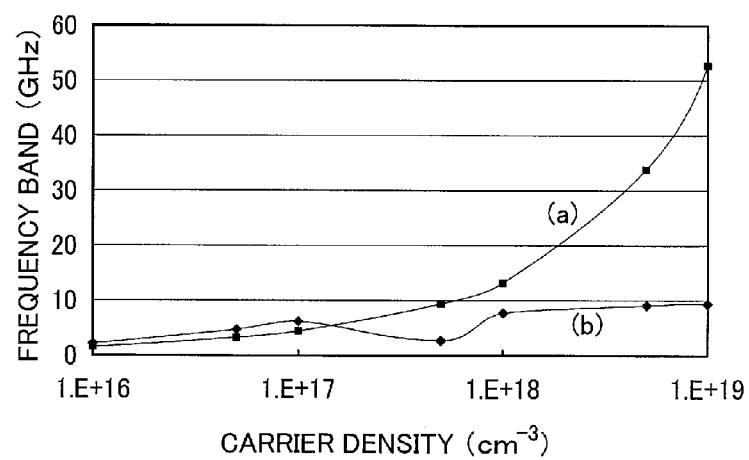
FIG. 9 is a graph showing the operation frequency band with respect to the carrier density in the "unburied" structure and the "buried" structure.

FIG. 9 is a graph showing the operation frequency band with respect to the carrier density in the "unburied" structure and the "buried" structure. Referring to FIG. 9, (a) represents the "buried" structure, and (b) represents the "unburied" structure. The operation frequency band of optical modulation has tradeoff relationships to the size reduction effect by the modulation efficiency improvement and the influence of an increase in the electrical capacitance by the "buried" structure. Basically, letting $n_{eff}$ be the effective refractive index felt by the optical signal field, and $\lambda$ be the optical signal wavelength, the frequency band widens when the burying depth is $\lambda/n_{eff}$ or less. It was also confirmed that a carrier density of about $10^{18}/cm^3$ enables a high-speed operation at 10 GHz or more.

In addition to the above-described factors, the mobility and life of carriers are very important for improving the frequency band. Especially, the carrier mobility in the second silicon layer 109 made of polysilicon is a problem for the high-speed operation. Hence, when the second silicon layer 109 is made of polysilicon, increasing the particle size by recrystallization in annealing and thus improving the carrier mobility are effective for enabling an operation at a higher speed. In addition, improving the crystal quality of the second silicon layer 109 using epitaxial lateral overgrowth (ELO) or the like is also effective for enabling an operation at a higher speed.

Figure 10A:
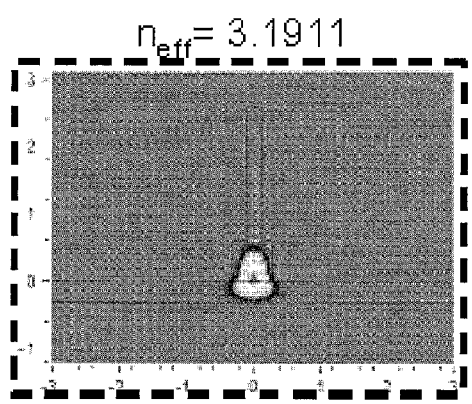
FIG. 10A is a sectional view showing the simulation result of the light intensity distribution and the effective refractive index ($n_{eff}$) in a waveguide having an electrode extraction portion (first electrode extraction portion) on the core.

The simulation results of the light intensity distribution and the effective refractive index ($n_{eff}$) in the waveguide in the presence/absence of the electrode extraction portion (first electrode extraction portion) on the core will be explained with reference to FIGS. 10A and 10B. The light intensity distribution is represented by the density distribution that spreads from the center of the core having the rib structure. FIG. 10A shows a case in which the electrode extraction portion is formed on the core, and FIG. 10B shows a case in which no electrode extraction portion is formed.

The core having the rib structure has a width of 0.6 µm and a height of 0.7 to 0.9 µm. The thickness of the slab portion is 0.3 µm. The electrode extraction portion shown in FIG. 10A has a width of about 0.2 µm. In either case, the rib structure and the electrode extraction portion are made of silicon and covered with oxide silicon.

Figure 10B:
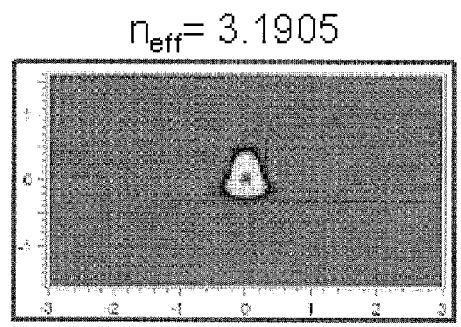
FIG. 10B is a sectional view showing the simulation result of the light intensity distribution and the effective refractive index ($n_{eff}$) in a waveguide.

As shown in FIGS. 10A and 10B, the effective refractive index difference is 0.1% or less. Hence, it was confirmed by calculations and experiments that connecting the optical waveguide shown in FIG. 10B to the optical modulation structure of the exemplary embodiment shown in FIG. 10A allows optical coupling that is so efficient that the optical loss is negligible.

Fifth Exemplary Embodiment

Figure 11:
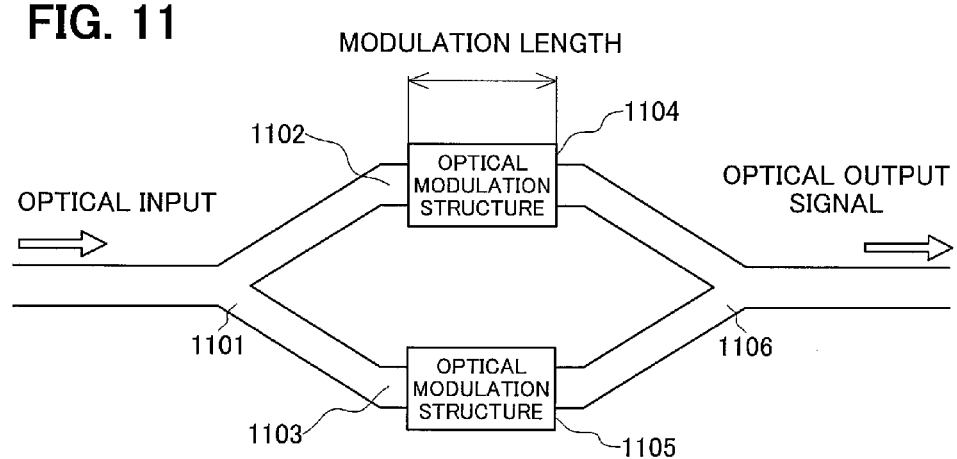
FIG. 11 is a sectional view showing the simulation result of the light intensity distribution and the effective refractive index ($n_{eff}$) in a waveguide without the electrode extraction portion (first electrode extraction portion) on the core.

The fifth exemplary embodiment will be described next. A Mach-Zehnder interferometer type optical modulator using the optical modulation structure of the above-described exemplary embodiment will be explained below with reference to FIG. 11. In this optical modulator, an input optical signal field is branched by an optical branching portion 1101 into a first arm portion 1102 and a second arm portion 1103, coupled by an optical coupling portion 1106 again, and output as an optical output signal. An optical modulation structure 1104 according to the exemplary embodiment is arranged in the first arm portion 1102. Similarly, an optical modulation structure 1105 according to the exemplary embodiment is arranged in the second arm portion 1103.

In this optical modulator, the optical modulation structure 1104 of the first arm portion 1102 and the optical modulation structure 1105 of the second arm portion 1103 perform optical modulation of the branched optical signals. After the optical modulation, the optically modulated branched light components cause phase interference in the optical coupling portion 1106 and are converted into a light intensity modulated signal. In this optical modulator, the optical branching portion 1101 arranged on the input side branches input light into optical signals having equal power for the first arm portion 1102 and the second arm portion 1103.

After the input light is thus branched, a positive voltage is applied to the optical modulation structure 1104 of the first arm portion 1102 to store carriers on both side of the dielectric layer that constitutes the SIS structure of the optical modulation structure 1104. On the other hand, a negative voltage is applied to the optical modulation structure 1105 of the second arm portion 1103 to remove carriers from both sides of the dielectric layer that constitutes the SIS structure of the optical modulation structure 1105. In the optical modulation structure 1104 set in the carrier storage mode, the refractive index felt by the optical signal field in this region becomes low.

On the other hand, in the optical modulation structure 1105 set in the carrier removal (depletion) mode, the refractive index felt by the optical signal field becomes high. As a result, the optical signal phase difference between the first arm portion 1102 and the second arm portion 1103 is maximized. When the optical coupling portion 1106 on the output side couples the optical signals transmitted through the two arms, light intensity modulation occurs. It has been confirmed that the Mach-Zehnder interferometer type optical modulator according to this exemplary embodiment with the above-described arrangement can transmit an optical signal at 20 Gbps or more.

The optical modulator formed from a Mach-Zehnder interferometer can also be applied to an optical modulation structure or matrix optical switch with a higher transfer rate by arranging the optical modulators in parallel or in series.

Note that in the above-described exemplary embodiments, the first silicon layer that forms the core and the slab regions is of a p type, and the second silicon layer is of an n type. However, the exemplary embodiment is not limited to this. The first silicon layer that forms the core and the slab regions may be of an n type, and the second silicon layer may be of a p type. Each silicon layer need only be made of one of polysilicon, amorphous silicon, strained silicon, single-crystal silicon, and $Si_xGe_{1-x}$.

Some or all of the above-described exemplary embodiments can also be described as in the following additions but are not limited to the followings.

(Addition 1)

There is provided an optical modulation structure comprising at least:

a lower cladding layer formed on a substrate;

a first silicon layer integrally formed from silicon of a first conductivity type on the lower cladding layer, including a core and slab regions arranged on both sides of the core and connected to the core;

a concave portion formed in an upper surface of the core;

a second silicon layer of a second conductivity type formed on a dielectric layer in the concave portion so as to fill the concave portion;

an upper cladding layer formed on the core;

a first electrode extraction portion formed on the core and connected to the second silicon layer; and a second electrode extraction portion connected to each slab region.

(Addition 2)

There is provided an optical modulation structure according to addition 1, wherein the concave portion has a central region where an opening is wider than that of an upper portion of the core, and a sidewall of the central region is curved.

(Addition 3)

There is provided an optical modulation structure according to additions 1 and 2, wherein a width of the second silicon layer is not more than twice a spread width of a region where free carriers are stored, removed, or inverted on both sides of the dielectric layer.

(Addition 4)

There is provided an optical modulation structure according to any one of additions 1 to 3, wherein letting $n_{eff}$ be an effective refractive index felt by an electric field of an optical signal guided through an optical waveguide formed from the core, and λ be a wavelength of the optical signal, a height of the second silicon layer is not more than $\lambda/n_{eff}$.

(Addition 5)

There is provided an optical modulation structure according to any one of additions 1 to 4, wherein a region where an electric field of an optical signal guided through an optical waveguide formed from the core has a peak intensity is arranged in a region where free carriers are stored, removed, or inverted on both sides of the dielectric layer.

(Addition 6)

There is provided an optical modulation structure according to any one of additions 1 to 5, wherein the first silicon layer is made of at least one material selected from the group consisting of polysilicon, amorphous silicon, strained silicon, single-crystal silicon, and $Si_xGe_{1-x}$.

(Addition 7)

There is provided an optical modulation structure according to any one of additions 1 to 6, wherein the first electrode extraction portion is converted into the second conductivity type by introducing an impurity at a concentration higher than in the second silicon layer, and the second electrode extraction portion is converted into the first conductivity type by introducing an impurity at a concentration higher than in the first silicon layer.

(Addition 8)

There is provided an optical modulator comprising a Mach-Zehnder interferometer type structure including a first arm and a second arm, each of the first arm and the second arm comprising an optical modulation structure of any one of additions 1 to 7.

(Addition 9)

There is provided an optical modulator according to addition 8, comprising a plurality of Mach-Zehnder interferometer type structures.

(Addition 10)

There is provided an optical modulator according to addition 9, wherein the plurality of Mach-Zehnder interferometer type structures are arranged in parallel.

(Addition 11)

There is provided an optical modulator according to addition 9, wherein the plurality of Mach-Zehnder interferometer type structures are arranged in series.

The present invention has been described above with reference to the exemplary embodiments. However, the present invention is not limited to the above-described exemplary embodiments. Various changes and modifications which may occur to those skilled in the art can be made for the arrangement and details of the present invention without departing from the scope of the present invention.

This application is based upon and claims the benefit of priority from Japanese Patent Application No. 2009-042317, filed on Feb. 25, 2009, the disclosure of which is incorporated herein in its entirety by reference.

EXPLANATION OF THE REFERENCE NUMERALS AND SIGNS

101 . . . support substrate, 102 . . . lower cladding layer, 103 . . . first silicon layer, 104 . . . core, 104a . . . concave portion, 105 . . . slab region, 106 . . . p$^+$-type region, 107 . . . electrode contact layer, 108 . . . dielectric layer, 109 . . . second silicon layer, 110 . . . upper cladding layer, 111 . . . first electrode extraction portion

The invention claimed is:

1. An optical modulation structure comprising at least:
a lower cladding layer formed on a substrate;
a first silicon layer integrally formed from silicon of a first conductivity type on said lower cladding layer, including a core and slab regions arranged on both sides of the core and connected to the core;
a concave portion formed in an upper surface of the core;
a second silicon layer of a second conductivity type formed on a dielectric layer in said concave portion so as to fill the concave portion;
an upper cladding layer formed on the core;
a first electrode extraction portion formed on the core and connected to said second silicon layer; and
a second electrode extraction portion connected to each slab region.

2. An optical modulation structure according to claim 1, wherein
said concave portion has a central region where an opening is wider than that of an upper portion of the core, and
a sidewall of the central region is curved.

3. An optical modulation structure according to claim 1, wherein a width of said second silicon layer is not more than twice a spread width of a region where free carriers are stored, removed, or inverted on both sides of the dielectric layer.

4. An optical modulation structure according to claim 1, wherein letting $n_{eff}$ be an effective refractive index felt by an electric field of an optical signal guided through an optical waveguide formed from the core, and $\lambda$ be a wavelength of the optical signal, a height of said second silicon layer is not more than $\lambda/n_{eff}$.

5. An optical modulation structure according to claim 1, wherein a region where an electric field of an optical signal guided through an optical waveguide formed from the core has a peak intensity is arranged in a region where free carriers are stored, removed, or inverted on both sides of the dielectric layer.

6. An optical modulation structure according to claim 1, wherein said first silicon layer is made of at least one material selected from the group consisting of polysilicon, amorphous silicon, strained silicon, single-crystal silicon, and $Si_xGe_{1-x}$.

7. An optical modulation structure according to claim 1, wherein
said first electrode extraction portion is converted into the second conductivity type by introducing an impurity at a concentration higher than in said second silicon layer, and
said second electrode extraction portion is converted into the first conductivity type by introducing an impurity at a concentration higher than in said first silicon layer.

8. An optical modulator comprising a Mach-Zehnder interferometer type structure including a first arm and a second arm, each of said first arm and said second arm comprising an optical modulation structure comprising at least:
a lower cladding layer formed on a substrate;
a first silicon layer integrally formed from silicon of a first conductivity type on said lower cladding layer, including a core and slab regions arranged on both sides of the core and connected to the core;
a concave portion formed in an upper surface of the core;
a second silicon layer of a second conductivity type formed on a dielectric layer in said concave portion so as to fill the concave portion;
an upper cladding layer formed on the core;
a first electrode extraction portion formed on the core and connected to said second silicon layer; and
a second electrode extraction portion connected to each slab region.

9. An optical modulator according to claim 8, comprising a plurality of Mach-Zehnder interferometer type structures.

10. An optical modulator according to claim 9, wherein said plurality of Mach-Zehnder interferometer type structures are arranged in parallel or in series.

* * * * *